United States Patent [19]
Taccetta et al.

[11] Patent Number: 5,187,383
[45] Date of Patent: Feb. 16, 1993

[54] HEADLIGHT ACTUATOR ASSOCIATED WITH WINDSHEILD WIPER ACTUATION HAVING DELAY CIRCUITS AND DAYLIGHT DETECTION

[76] Inventors: Alfonse Taccetta, One Bonnie Briar Rd., Yonkers, N.Y. 10710; Anthony Fico, 22 Sheridan Ave., Apt. 5B, Mount Vernon, N.Y. 10550

[21] Appl. No.: 609,587

[22] Filed: Nov. 6, 1990

[51] Int. Cl.⁵ .......................... B60L 1/14; B60Q 1/02; H01H 47/24
[52] U.S. Cl. .................... 307/10.8; 315/83; 361/175
[58] Field of Search ............ 307/10.1, 10.8, 9.1, 307/117; 315/77, 82, 83; 318/446, DIG. 2; 361/160, 173, 175

[56] References Cited

U.S. PATENT DOCUMENTS

| | | | |
|---|---|---|---|
| 3,879,617 | 4/1975 | Faller | 307/117 |
| 3,909,619 | 9/1975 | Kniesly et al. | 307/10.8 |
| 4,011,460 | 3/1977 | Kniesly et al. | 307/10.8 |
| 4,015,137 | 3/1977 | Kniesly et al. | 307/10.8 |
| 4,236,099 | 11/1980 | Rosenblum | 315/83 |
| 4,956,562 | 9/1990 | Benedict et al. | 307/10.8 |
| 5,027,001 | 6/1991 | Torbert | 307/10.1 |

Primary Examiner—Sharon D. Logan
Assistant Examiner—Richard T. Elms
Attorney, Agent, or Firm—Lilling & Lilling

[57] ABSTRACT

The disclosed circuit for actuating headlights has two time delay circuits, an AND gate, a power relay, and connections for appropriate installation to the circuitry of the automobile. When windshield wipers are operated, a pulse of the windshield wiper motor causes the first time delay circuit and the second time delay circuit to run timing cycles. The timing cycle of the first circuit is shorter than the timing cycle of the second circuit, and the first circuit is restarted with each pulse of the windshield wiper motor. Each timing delay unit has an output signal which is a logical "one" when a cycle is being run and a logical "zero" when a cycle is not being run. When the AND gate receives logical zeros from the second time delay circuit, and logical ones from the first time delay circuit, windshield wipers are in use and the headlights and parking lights are switched on. A daylight detection circuit may be incorporated to provide safe use of the unit in dusk hours. When the windshield wipers are switched off, the daylight detector will not allow the headlights to be switched off along with the windshield wipers unless it receives 2½ minutes of uninterrupted daylight. Filtering circuitry is provided which prevents the possibility of interference or roughness in the power supplied by the engine interfering with the operation of the device.

7 Claims, 4 Drawing Sheets

HEADLIGHT ACTUATOR ASSOCIATED WITH WINDSHEILD WIPER ACTUATION HAVING DELAY CIRCUITS AND DAYLIGHT DETECTION

BACKGROUND OF THE INVENTION

1. Field of the Invention

The present invention is in the field of electrical circuitry and, more specifically, relates to an electrical device for automatically operating the headlights of an automobile in conjunction with operation of the windshield wipers of an automobile.

2. Description of the Related Art

Recent and pending legislation has required that, when visability or weather conditions are such that the use of windshield wipers are required, headlights of an automobile must also be turned on. Many states already have such laws, including, for example, the states of New York, Florida and Massachusetts. Penalties for failing to comply with these new laws can be severe. For example, the penalty in the state of New York for failing to comply with this statute is $100.00.

Current headlight controls in automobiles are independent from the controls of windshield wipers. Thus, when an operator of an automobile turns on the windshield wipers of the car, the operator must also remember to turn on the headlights. Further, when the windshield wipers are switched off, the operator must remember to switch off the headlights. Otherwise, when the operator reaches the intended destination, it is likely that the operator will not remember to turn off the headlights if it is still daylight when the operator leaves the car. Headlights left on in such a manner can very rapidly drain the battery of the automobile leaving the operator unable to start the car upon returning to the automobile. Thus, current automobiles with independently operated windshield wipers and headlights are likely to cause great inconvenience to operators in their attempts to comply with the newly passed laws.

There is also known in the art devices which operate to automatically switch on headlights when daylight falls to a certain level. These devices do not sufficiently protect an operator of an automobile in compliance with the newly passed laws because weather conditions could require the use of windshield wipers while sufficient daylight remained to prevent the headlights from automatically switching on. Thus, these daylight operated devices do not provide the operator of an automobile with an easy and satisfactory way to comply with the newly passed laws.

SUMMARY OF THE INVENTION

It is thus an object of the present invention to provide an electrical device which can be easily installed in automobiles to cause the headlights of the automobile to automatically switch on when the windshield wipers are switched on.

It is further an object of the present invention to provide an electrical device which switches the headlights off when windshield wipers are no longer in use.

It is further an object of the present invention to provide an electrical circuit which tests for daylight conditions when windshield wipers are switched off so that headlights do not automatically switch off when windshield wipers are switched off after dark.

Another object of the present invention is to improve safety of operation of an automobile by insuring that headlights are switched on when windshield wipers are switched on to improve visibility and the operator's ability to see.

The device according to the invention comprises a circuit having three connectors. The connectors are used to install the circuit into the automobile. The first connection is called a windshield wiper switch connector and is attached to the wiring of the windshield wiper switch at the windshield wiper motor. The second connector is called the accessory connector and is connected to the powerline for the accessories of the car. The third connector is a ground connector and is connected to any suitable ground of the automobile. The circuit is thus activated when the automobile is turned on and the windshield wiper switch is in either the continuous or intermittent wiping position. The device reacts to pulses from the windshield wiper motor which trigger various timing devices designed to determine whether the windshield wipers are set on continuous mode, intermittent mode, or whether they have just been used for windshield washers or mist. If the windshield wipers are in continuous or intermittent mode, the headlights will be switched on. If only the windshield washers or mist button have been used, the headlights will not be switched on. Since the longest pulse between intermittent wipers currently used in day cars is approximately 20–25 seconds, the timing cycle of the delay device should be greater than 20–25 seconds, and is preferred to be approximately 37 seconds. If, after a pulse (a closure of the wiper actuator switch) from the windshield wiper motor, another pulse is not received by the device within 37 seconds, the wipers must have been used for a single pulse, i.e. windshield washers or mist, and the headlights will not be turned on.

A daylight detector is also preferably incorporated into the circuit. The daylight detector incorporates timing devices and a phototransistor into the circuit so that, if windshield wipers are switched off in a situation where the headlights have been turned on by the device, the headlights will not also be switched off until the daylight detector has determined that it is daylight outside. The timing circuits of the daylight detector are set for 2.5 minute periods so that, if windshield wipers are switched off, the headlights will remain on until the phototransistor of the daylight detector has received 2.5 minutes of uninterrupted light. This feature is to protect from the undesirable occurrence of switching off windshield wipers at night and being suddenly surprised by the headlights also switching off. The sensitivity of the daylight detector can be adjusted through a variable resistor contained in the circuitry of the daylight detector. The variable resistor can optionally be attached to an adjustable knob and a light emitting diode (LED) so that, during installation of the device, the adjustable knob can be used to set the variable resistor of the daylight detector to activate the headlights at a desired level of darkness.

It is understood that, when the terminology "headlights" is used in this application, tail lights and parking lights are also intended to be included. Thus, when the unit operates to switch on the headlights, tail lights and parking lights are also switched on. The device operates independently from the switch for operating the headlights and parking lights. Thus, if parking lights are turned on, and then windshield wipers are turned on, the headlights will also be activated. In such a situation, when the windshield wipers are turned off, the headlights would also deactivate, and the parking lights, which had been switched on prior to the use of windshield wipers, would remain on.

The power to run this unit is supplied from the wiper power itself. The power is filtered through a coil and a series of a capacitors to eliminate "engine hash". The power used for the headlights comes from the battery, as in normal operation of the headlights, and the unit is inoperable when the ignition is turned off.

Although various circuitry for achieving the above objects are possible, the presently preferred circuit comprises an opto-isolator which isolates the circuit of the actuator from engine hash and noise from the running of the engine. A pulse of the windshield wiper motor triggers a first time delay unit, which starts a timing cycle determined by a resistor and a capacitor which is preferably preset for approximately 37 seconds. The output of the first time delay circuit leads to a second time delay circuit and triggers that circuit to start a timing cycle. The timing circuit of the second time delay is set to run for approximately one minute. The outputs of each time delay circuit emit either logical "ones" or logical "zeros". The headlights are switched on by a relay switch which is connected to the output of the first time delay unit through a darlington transistor. Another transistor, configured as an NPN transistor, is connected to the output of the second time delay. A junction connects the collector of the NPN transistor to the power source for the darlington transistor. Thus, when the NPN transistor is turned on, current is shunted from the base of the darlington transistor and the headlights do not yet operate.

The headlights are switched on when the first time delay is still in a cycle at the end of a cycle of the second time delay. In other words, the headlights can only function when a logical "one" is being put out by the output of the first time delay while a logical "zero" is being put out by the second time delay. This situation is brought about by a reverse diode located between the output of the first time delay and the darlington transistor. This function of the circuit may also be performed by a modified AND gate.

The preferred embodiment also incorporates a daylight detector circuit. The daylight detector functions to prevent headlights from switching off when windshield wipers have been switched on during daylight hours and are subsequently switched off after dark. In such a situation, without a daylight detector, an operator of an automobile could be surprised and hazardous conditions could result by headlights automatically switching off, along with the windshield wipers, in a situation where the headlights are necessary. Thus, the daylight detector functions to detect whether daylight conditions are present when windshield wipers are switched off. If daylight conditions are present, the headlights will also be switched off. If daylight conditions are not present, the headlights will remain on until the car is turned off, or until daylight conditions are once again present.

The daylight detector of the presently preferred embodiment comprises a phototransistor, an operational amplifier, a missing pulse monostable time delay, and a power transistor. When daylight falls below a threshold level, the operational amplifier will emit a signal from its output. This signal triggers a timing cycle of the missing pulse monostable time delay. Once activated, the time delay starts a 2.5 minute cycle and applies a signal keeping the first time delay of the circuit in an on state. This keeps the output of the first time delay emitting logical "ones". This keeps the proper configuration of logical "ones" and "zeros" emitting from the outputs of the first and second time delay circuits which keeps the headlights in an on state. Should the phototransistor be exposed to 2.5 minutes of uninterrupted light, the output of the missing pulse monostable time delay will change states. Thus, the output of the first time delay circuit will be allowed to return to a low state, emitting logical "zeros", and the headlights will be switched off. The daylight detector is attached to the circuitry so that it is only operated when the headlight actuator unit is in use.

Alternatively, the daylight detector can be wired into the circuitry so that it operates at all times, independently of the windshield wipers, to cause headlights to be switched on when daylight fades beyond a certain threshold level. It is further possible for the circuit to be made in such a fashion that the user chooses the mode of operation of the daylight detector upon installation of the device into the automobile. Such a configuration could be incorporated into the circuitry of the present invention resulting in a headlight actuator that turns on headlights not only when windshield wipers are switched on but also under any circumstances when daylight fades beyond a certain threshold. Such a device is expressly intended to fall within the scope of the presently disclosed invention.

Thus disclosed is an electrical circuit for a device which can be installed during production or after the sale of automobiles which automatically switches on headlights when windshield wipers are operated in intermittent or constant mode. The control switch of the device will be different depending on whether the device is sold for factory installation or to an after-market user. For factory installation, the control switch would have all the standard settings for headlights and yet include settings for control of the headlight actuator. Such a device is easy to install into an automobile, and can help an operator of an automobile avoid receiving fines for failure to comply with the above mentioned laws requiring the use of headlights in conjunction with windshield wipers when the use of windshield wipers is necessitated. Also, the operator need not be concerned about leaving headlights on in the daytime hours upon reaching a destination, resulting in a drained battery. The operator is also able to operate the automobile more safely in that headlights are switched on in conditions requiring the use of windshield wipers to improve both visibility of the car and the driver's ability to see.

The circuit also allows the safe use of the unit in dusk conditions when headlights may not be required to see adequately when windshield wipers are switched on, but when headlights may be required due to darkness upon switching windshield wipers off.

BRIEF DESCRIPTION OF THE DRAWINGS

A detailed description of the preferred embodiments of the invention follows with reference to the accompanying drawings in which.

DETAILED DESCRIPTION OF THE PREFERRED EMBODIMENTS

The preferred embodiments of the present invention will now be described with specific reference to the figures in which like numerals represent like elements.

Figure 1:
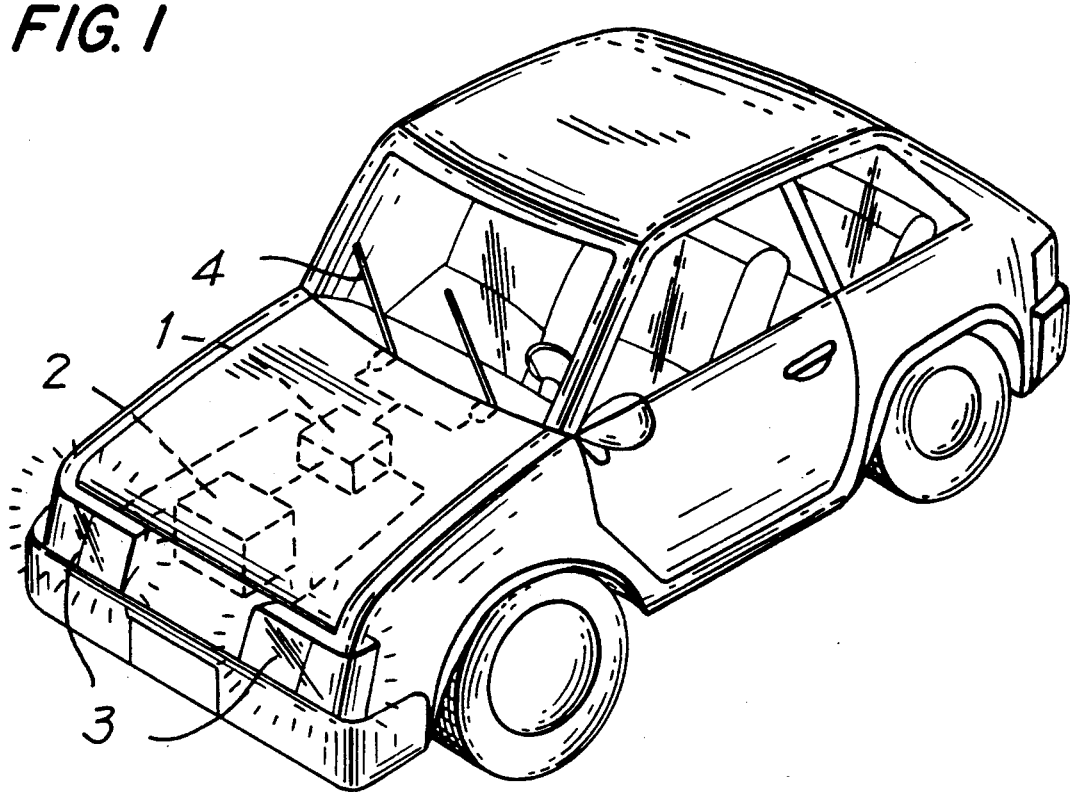
FIG. 1 is a perspective view of a headlight actuator and a daylight detector installed in an automobile, according to the invention.

Referring to FIG. 1, a device 1 for actuating headlights is shown in its environment. As shown, the headlight actuator 1 draws power from the battery 2 and actuates the headlights 3 of the automobile when the windshield wipers 4 are in operation.

Figure 2:
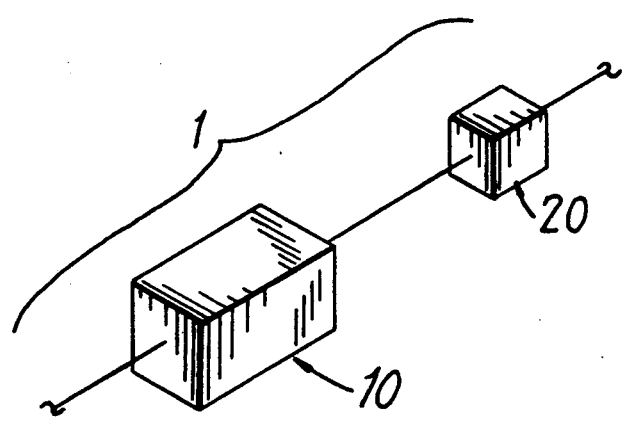
FIG. 2 is a perspective view of the headlight actuator and daylight detector, according to the invention.

With reference to FIG. 2, the preferred embodiment of the invention is shown to include two main components. These components comprise a main circuit 10, and a daylight detector 20.

Figure 3:
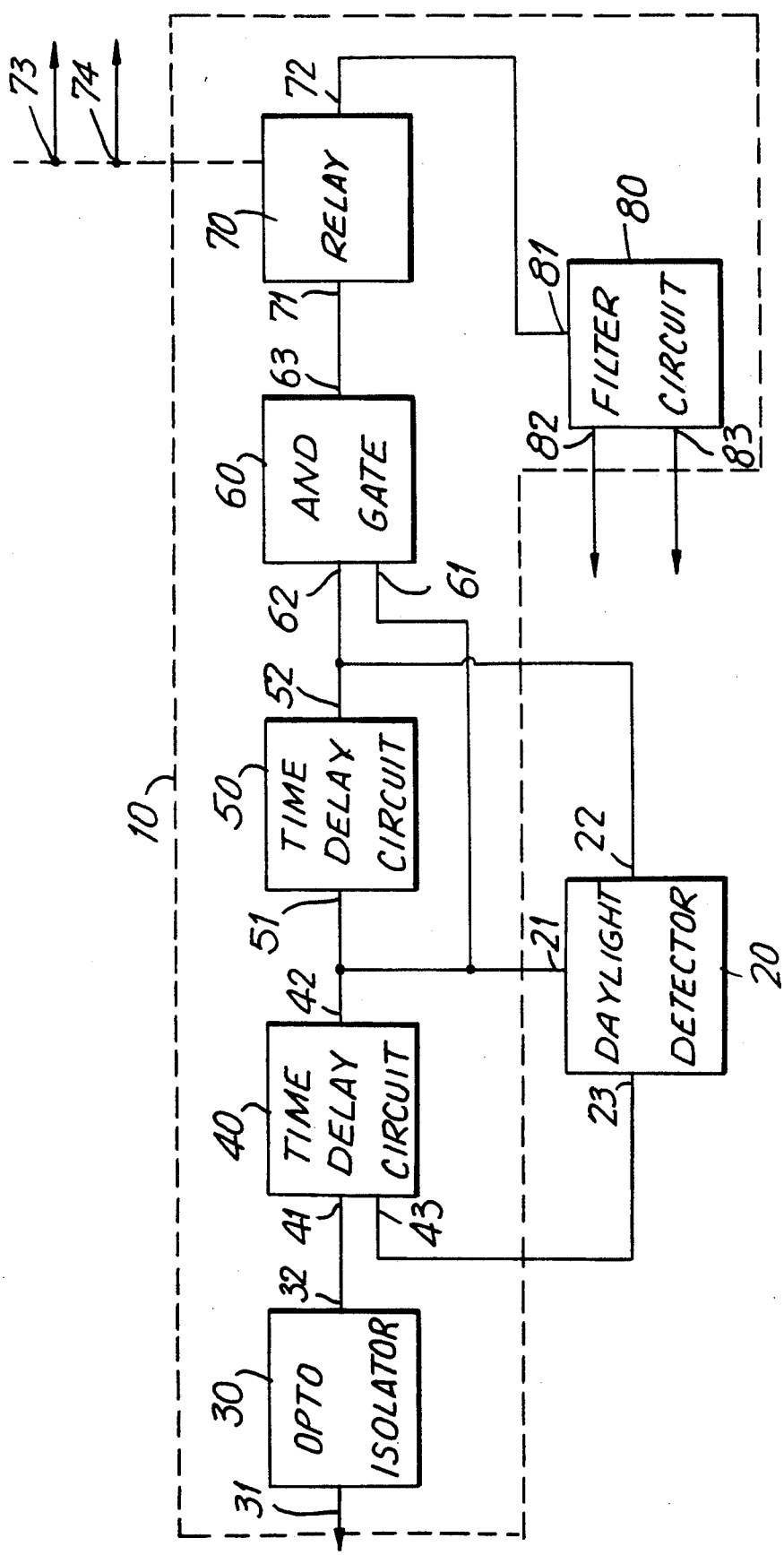
FIG. 3 is a block diagram of the headlight actuator and daylight detector, according to the invention.

With reference to FIG. 3, the headlight actuator 1 is generally described as follows. The main circuit 10 comprises an opto-isolator 30 which has an input 31 adapted for connection with a wiper switch. The opto-isolator also has an output 32. A first time delay circuit 40 has an input 41 which is connected to the output 32 of the opto-isolator. The first time delay circuit also has an output 42. The main circuit 10 further comprises a second time delay 50. The second time delay 50 has an input 51 which is connected to the output 42 of the first time delay 40. The second time delay 50 also has an output 52. The main circuit further comprises an AND gate 60 having a first input 61 connected to the output 42 of the first time delay circuit 40, and a second input 62 connected to the output 52 of the second time delay circuit 50. The AND gate 60 also has an output 63. The AND gate is preferably a modified AND gate to perform the function A−B=C. The device further comprises a relay 70 having an input 71 connected to the output 63 of the AND gate 60, and an output 72. The relay 70 is connected to the headlight operating switch 73 and the parking light operating switch 74. The main circuit 10 further comprises a filter circuit 80. The filter circuit 80 has an input 81 connected to the output 72 of the relay 70, an output 82 adapted for connection to the accessory power line of the automobile, and an output 83 adapted for connection to a ground of the automobile.

The daylight detector 20 has a first input 21 connected to the output 42 of the first time delay circuit 40, a second input 22 connected to the output 52 of the second time delay circuit 50, and an output 23 connected to an input 43 of the first time delay circuit 40.

The headlight actuator 1 shown in FIG. 3 operates as follows. When windshield wipers are switched on, a pulse (closure of the wiper actuator switch) is received by input 31 of the opto-isolator 30. This pulse is received by the first time delay circuit 40. When the first time delay circuit 40 receives this pulse, a timing cycle is begun which runs for a preset time. This preset time should be of an increment which slightly exceeds the longest interval between pulses of windshield wipers set on intermittent use. The longest delays found to exist in currently used automobiles are in the range of 20–25 seconds. Therefore, the first time delay circuit 40 of the preferred embodiment is set to time a cycle greater than 20–25 seconds, and preferably of 37 seconds. The pulse received by the first time delay circuit 40 also triggers the second time delay circuit 50. The second time delay circuit 50 is designed to run for a second timing cycle of a preset time. This second preset time must be of a sufficiently longer length than the preset time of the first time delay circuit so that, when the second time delay circuit has completed its timing cycle, the first time delay circuit can only be in a cycle if a subsequent cycle has been started by a subsequent pulse of the windshield wiper motor. A preferable time for the timing cycle of the second time delay circuit 50 has been found to be one minute.

A circuit is next incorporated into the main circuit 10 which switches on the headlights only when the second time delay circuit has completed its timing cycle of one minute and the first time delay circuit 40 is in the process of running a timing cycle. This circuitry is shown in FIG. 3 as an AND gate 60. The first input 61 of the AND gate 60 receives the output from the first time delay circuit 40. The second input 62 of the AND gate 60 receives input from the output 52 of the second time delay circuit 50. In this manner, if the AND gate detects the completion of the timing cycle of the second time delay circuit 50 at a time when the first time delay circuit 40 is running a timing cycle, a signal is sent to the relay 70 which switches on the headlights and parking lights.

The connection of the circuit to the power supply of the car is completed through a filter circuit 80. The input 81 of the filter circuit 80 is connected to the output 72 of the relay 70. The combination of the opto-isolator 30 and the filter circuit 80 help to eliminate spikes and engine hash produced in the power supplied by the running of the engine. This is important to help avoid the time delay circuits being set off by signals other than a pulse from the windshield wiper motor.

The AND gate 60 allows the relay 70 to close the switches 73, 74 of the headlights and parking lights only under certain conditions. When the first and second time delay circuits 40, 50 are running a timing cycle, their respective outputs 42, 52 emit logical "one" signals. When either of these time delay circuits 40, 50 is not running a timing cycle, they emit a logical "zero" signal from their outputs 42, 52. The AND gate 60 thus only allows the relay to close and turn on headlights and parking lights when it receives a logical "zero" from the output 52 of the second time delay circuit 50 at the same time as it is receiving a logical "one" from the output 42 of the first time delay circuit 40 (i.e. A−B=C).

It is important to ensure that, when windshield wipers are switched off after dark, the headlights do not also deactivate and catch the operator of the vehicle by surprise. This situation is avoided by the daylight detector 20. The daylight detector 20 senses the level of available light and prevents the main circuit 10 from allowing the headlights and parking lights to shut off unless it receives 2.5 minutes of uninterrupted daylight following the last received pulse of the windshield wiper motor.

The function of the daylight detector could also be performed by a warning device such as a warning buzzer or bell that sounds when the windshield wipers are turned off prior to deactivation of the headlights.

It should be noted that equivalent elements to the AND gate 60 can be incorporated into the circuit to perform the same function of reacting to the appropriate outputs from the time delay circuits without the inclusion into the circuit of an actual AND gate 60. Such a configuration is employed in the presently preferred embodiment which will be described in the following paragraphs.

It should also be noted that the duration of the timing cycles of the first and second time delay circuits 40, 50 are controlled by varying the values of resistors and capacitors contained therein. These resistors and capacitors are also shown in the detailed description of the presently preferred embodiment which follows.

To install the presently disclosed device in an automobile, connectors for the main circuit attached to the wiring of the automobile as follows. The connector attached to the input 31 of the opto-isolator 30 should be attached to the wiring of the wiper switch. The connector attached to the output 82 of the filter circuit 80 should be attached to the accessory line of the automobile. Finally, the connector attached to the output 83 of the filter circuit 80 should be attached to any suitable ground of the automobile. The daylight detector 20 should be so oriented in the car that its light sensing element is exposed to outdoor conditions. This could preferably be mounted, for example, in the grill of the automobile or in the slats of the hood of the automobile.

Figure 4:
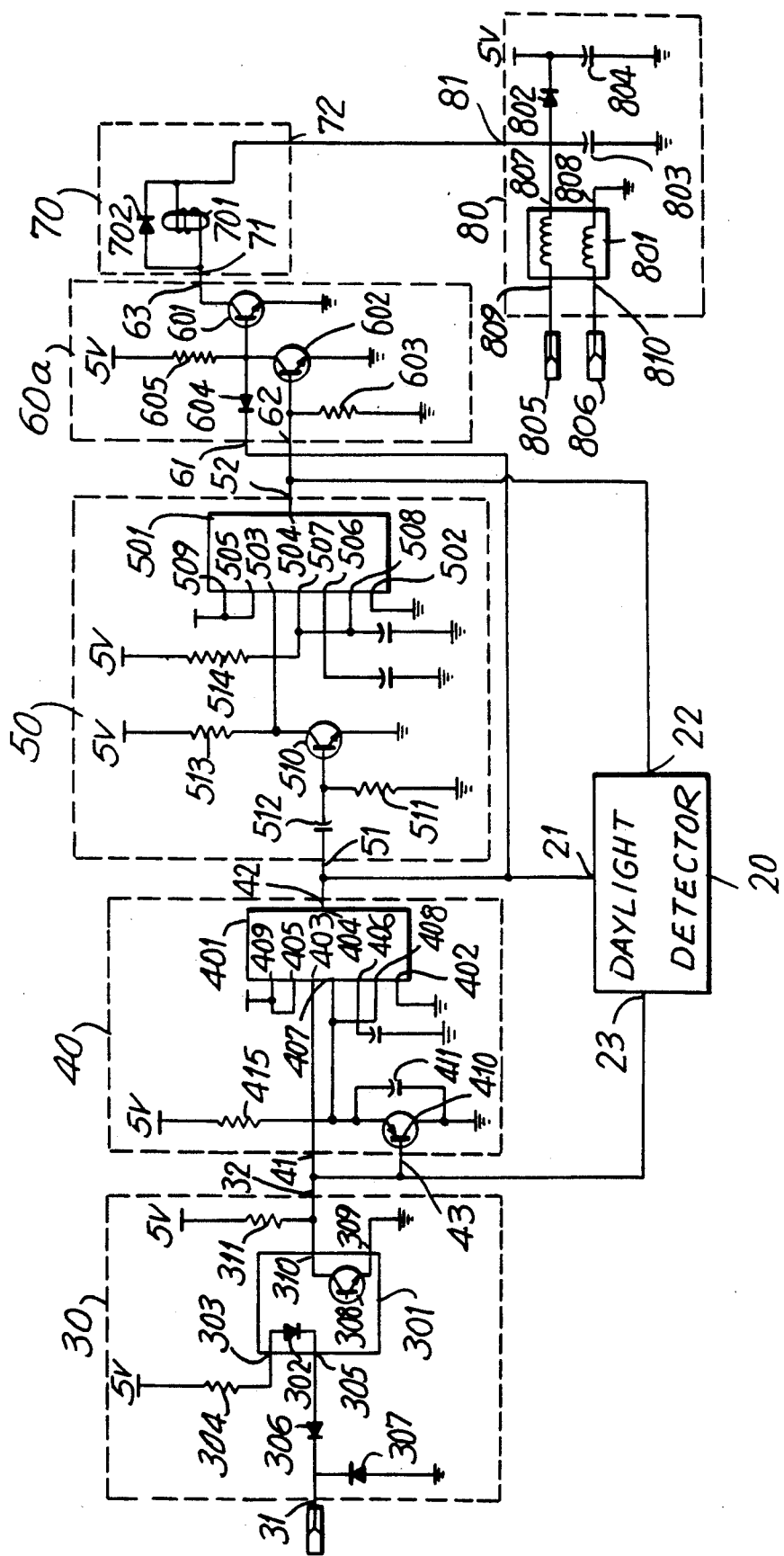
FIG. 4 is a schematic view of the preferred circuitry of the headlight actuator, according to the invention.
Figure 5:
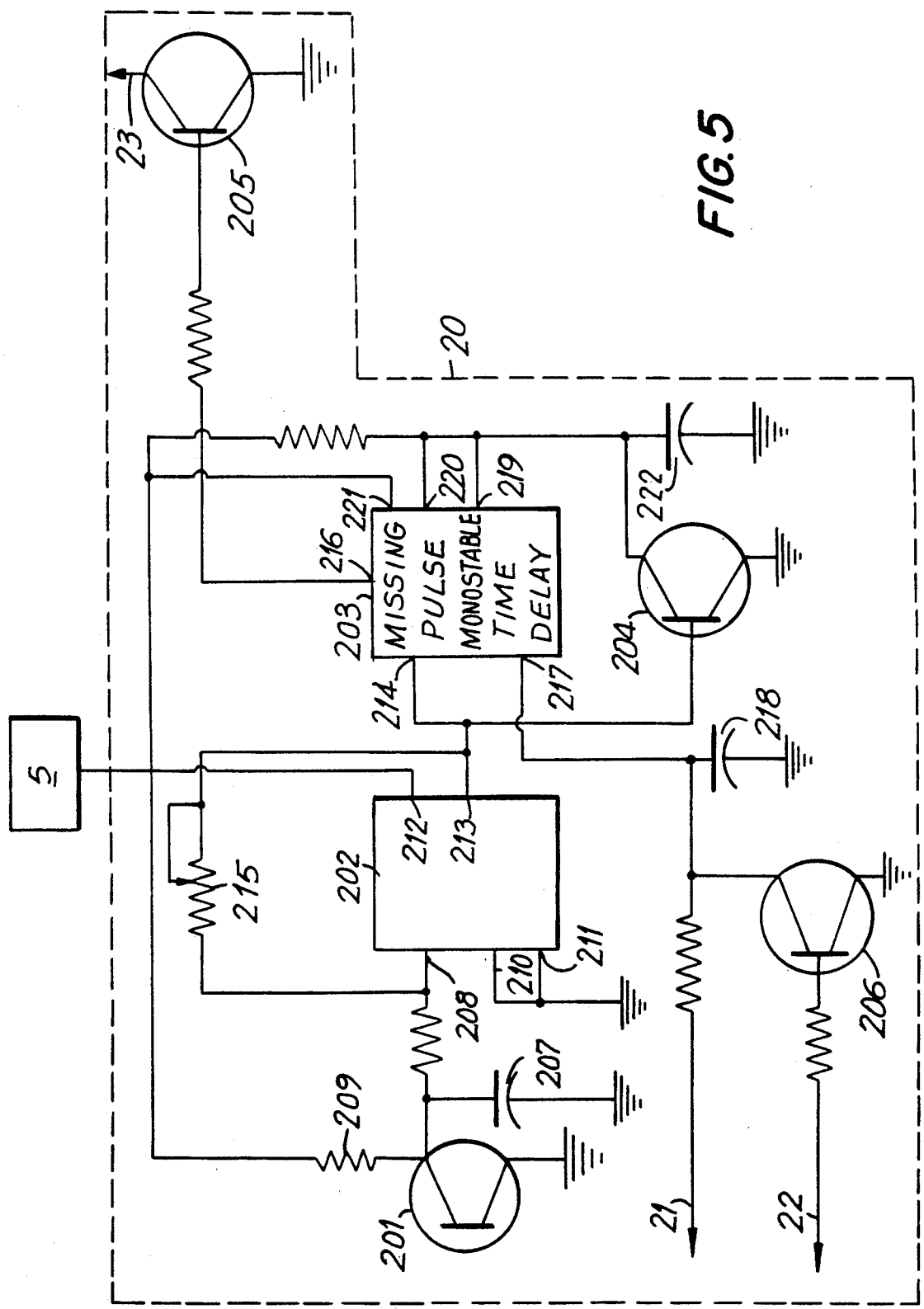
FIG. 5 is a schematic view of the preferred circuitry of a daylight detector of the headlight actuator, according to the invention.

With reference now to FIGS. 4 and 5, a detailed description will be given of the exact circuitry of the presently preferred embodiment.

The opto-isolator circuit 30 comprises an opto-isolator unit 301. The opto-isolator unit 301 comprises a diode 302 having a cathode serving as the first input 303 of the opto-isolator unit 301 which is connected through a resistor 304 to the power source 5 of the unit. The diode 302 has an anode which serves as the first output 305 of the opto-isolator unit 301. The first output 305 of the opto-isolator unit 301 is connected to the cathode of a diode 306. The anode of the diode 306 is connected to the input 31 of the opto-isolator circuit 30 which serves as the connector to the wiper switch wiring. Another diode 307 has its anode connected to ground and a cathode connected to the input 31 of the opto-isolator circuit 30 which is then connected to the connector with the windshield wiper switch. The opto-isolator unit 301 also comprises a phototransistor 308 which is activated by current through the diode 302. The emitter of the phototransistor 308 is connected to ground and serves as the second output 309 of the opto-isolator unit 301. The collector of the photo-transistor 308 serves as the second input 310 of the opto-isolator unit 301. The second input 310 of the opto-isolator unit 301 is connected through a resistor 311 to the power source 5 of the circuit. The collector terminal of the phototransistor 308 also serves as the output 32 of the opto-isolator circuit 30.

The first time delay circuit 40 comprises a first time delay unit 401 having a ground input 402 which is connected to ground, a trigger input 403 which is attached to the input 41 of the first time delay circuit 40 and output 404 which serves as the output 42 of the first time delay circuit 40, a reset input 405 which is connected to the power source 5, a control input 406 which is connected to ground through a capacitor for stable operation of the unit, a threshold input 407, a discharge input 408, and a positive power input 409 connected to the power source 5 of the unit. The first time delay circuit 40 further comprises a transistor 410 and capacitor 411. The base of the transistor 410 is connected through the input 41 of the first time delay circuit 40 to the output 32 of the opto-isolator circuit 30. The emitter of the transistor 410 and the negative terminal of the capacitor 411 are both connected to ground. The collector of the transistor 410 and the positive terminal of the capacitor 411 are both connected through a resistor 415 to power source 5 of the unit. The triggering, threshold, and discharge inputs 403, 407 and 408 are likewise connected through the resistor 415 to the power source 5. The triggering input 403, threshold input 407, and discharge input 408 are also all connected through the input 41 of the first time delay circuit 40 to the output 32 of the opto-isolator circuit 30.

The second time delay circuit 50 comprises a second time delay unit 501 having a ground input 502 which is connected to ground, a trigger input 503, an output 504 which serves as the output 52 of the second time delay circuit 50, a reset input 505, a control input 506, a threshold input 507, a discharge input 508 and a positive power input 509. The second time delay circuit further comprises a transistor 510 and a resistor 511. The cathode of the resistor 511 is connected to ground while the anode of the resistor 511 and the base of the transistor 510 are joined and connected to the positive terminal of a capacitor 512. The negative terminal of the capacitor 512 serves as the input 51 of the second time delay circuit 50 and is connected to the output 42 of the first time delay circuit 40. The emitter of the transistor 510 is connected to ground while the collector of the transistor 510 and the trigger input 503 of the second time delay unit 501 are joined and connected through a resistor 513 to the power source 5 of the unit. The positive power input 509 and reset input 505 are joined and connected to the power source 5 of the unit. The threshold input 507 and discharge input 508 are joined and connected through a resistor 514 to the power source 5 of the unit. The control input 506 is connected through a capacitor to ground for stable operation of the unit.

In the preferred embodiment of the circuitry of the invention, the AND gate 60 is replaced by a simpler but equivalent scheme of circuitry. This circuitry is indicated in FIG. 4 by the dashed box which is labeled reference numeral 60a. The equivalent circuitry 60a to the AND gate 60 comprises a Darlington transistor 601, a second transistor 602, a resistor 603 and a diode 604. The base of the second transistor 602 and the anode of the resistor 603 are joined and connected through the input 62 of the circuit 60a to the output 52 of the second time delay circuit 50. The cathode of the resistor 603 is connected to ground. The emitter of the second transistor 602 is likewise connected to ground. The collector of the second transistor 602 and the base of the Darlington transistor 601 are joined and connected to the anode of the diode 604, and also through a resistor 605 to the power source 5 of the unit. The emitter of the Darlington transistor 601 is connected to ground, and the collector of the Darlington transistor 601 forms the output 63 of the equivalent circuitry 60a of the AND gate 60.

The relay circuit 70 comprises a power relay 701 and a diode 702. The anode of the diode 702 and the input of the power relay 701 are joined and form the input 71 of the power relay circuit 70. This input 71 of the power relay circuit 70 is connected to the output 63 of the AND gate equivalent circuitry 60a. The cathode of the diode 702 and the output of the power relay 701 are joined and form the output 72 of the power relay circuit 70. The power relay 701 comprises two switches 73, 74 which are closed when the power relay 701 receives the appropriate signal through the AND gate equivalent circuitry 60a.

The filter circuit 80 comprises a coil 801, a diode 802, a first capacitor 803, a second capacitor 804, and two connectors 805, 806. The coil has a first input 807, which is joined with the negative terminal of the first capacitor 803 and the anode of the diode 802 to form the input 81 of the filter circuit 80. The coil has a second input 808 which is connected to ground. The positive terminal of the first capacitor 803 is also connected to ground. The cathode of the diode 802 and the positive terminal of the second capacitor 804 are joined and connected to the power source 5 of the unit. The negative terminal of the second capacitor 804 is connected to ground. The coil also has a first output 809 which is connected to the connector 805 for attachment to the accessory wiring of the automobile. The coil also has a second output 810 which is connected to the connector 806 for attachment to the ground of the automobile.

The circuitry shown in FIG. 4 functions as follows. When the windshield wiper switch is turned on, current is pulled through the diode 302 of the opto-isolator unit 301. This induces a current through the transistor 308 which triggers the trigger input 403 of the first time delay unit 401. This also starts a current running through the resistor 415 and the capacitor 411 of the first time delay unit 40. The values of the resistor 415 and capacitor 411 are adjusted to preset values for the desired length of time for the time delay circuit 40. In the preferred embodiment, the resistor has a value of 30K ohms and the capacitor 411 has the value of 100 uF. This gives the time delay circuit 40 a time cycle of approximately 37 seconds. With each pulse of the windshield wiper motor, the transistor 410 will clear the charge of the capacitor 411 and start a new timing cycle running. While the timing cycle is running, the output of the time delay unit 40 emits logical "ones". These logical ones trigger the trigger input of the second time delay unit 501. The value of the capacitor 515 and the resistor 514 of the second time delay circuit 50 establishes the length of the timing cycle of the second unit. In the preferred embodiment, the resistor 514 has the value of 560K ohms, while the capacitor 515 has the value of 100 uF. This provides for a timing cycle of one minute. While this timing cycle is running, the output 52 of the second time delay circuit 50 emits logical "ones". The logical signals emitted by the outputs 42, 52 of the time delay circuits 40, 50 are evaluated by the AND gate equivalent circuitry 60a. Until the appropriate combination of zeros from the output 52 and ones from the output 42 is received by the circuitry 60a, the transistor 602 shunts all current away from the transistor 601 and to ground. When the timing cycle of the circuit 50 finishes running for one minute, logical "zeros" are emitted from the output 52. When this happens, the diode 604 of the equivalent circuitry 60a becomes receptive to the logical ones from the output 42 of the second time delay circuit 40 which allows the transistor 601 to pass power through the resistor 605 to the relay circuit 70. This signal from the equivalent circuitry 60a allows the power relay 701 of the relay circuitry 70 to close the switches to the headlights and parking lights and switch them on. The power circuitry for the unit is completed through the filter circuit 80. The capacitors 803, 804, diode 802, and coil 801 all serve to remove spikes in the power from the engine and reduce engine hash providing for more reliable operation of the main circuit 10 of the headlight actuator 1. When the daylight detector 20 receives logical "zeros" from both the outputs 42, 52 of the time delay circuits 40, 50, the daylight detector sends a signal to the input 41 of the first time delay circuit 40 which keeps the capacitor 411 running timing cycles which allow the headlights and parking lights to remain on. If the daylight detector detects 2½ minutes of uninterrupted daylight, the signals to the capacitor 411 are stopped. This allows the unit to deactivate and turn off the headlights and parking lights after the windshield wipers have been switched off.

With reference now to FIG. 5, the preferred circuitry of the daylight detector 20 will be described. The daylight detector 20 comprises a phototransistor 201, an amplifier 202, a missing pulse monostable time delay 203, a power transistor 204, an output switching transistor 205, and an input transistor 206. The emitter of the phototransistor 201 is connected to ground. The collector of the phototransistor 201 is connected through a resistor to the power source 5 of the unit. An inverting input 208 of the amplifier 202 and the positive terminal of a capacitor 207 are joined and connected to the collector of the phototransistor 201 and through a resistor 209 to the power source 5 of the unit. The negative terminal of the capacitor 207 is connected to ground. A non-inverting input 210 and a minus voltage supply 211 of the amplifier 202 are joined and connected to ground. A positive voltage supply 212 of the amplifier 202 is connected to the power source 5 of the unit. The amplifier 202 also has an output 213. The missing pulse monostable time delay 203 has a trigger input 214 which is connected to the output 213 of the amplifier 202 and also through a variable resistor 215 to the collector of the phototransistor 201. The output 216 of the missing pulse monostable time delay 203 is connected to the base of the output switching transistor 205. A reset input 217 of the missing pulse monostable time delay 203 and the positive terminal of a capacitor 218 are joined and form the second input 21 of the daylight detector 20. The threshold input 219 and discharge input 220 of the missing pulse monostable time delay 203 are joined and connected to the power source 5 of the unit. A positive voltage supply input 221 of the missing pulse monostable time delay 203 is also connected to the power supply 5 of the unit. The discharge transistor 204 has a base which is connected to the output 213 of the amplifier 202 and also through variable resistor 215 to the collector of the phototransistor 201. The emitter of the discharge transistor 204 is connected to ground, while the collector of the discharge transistor 204 is connected to the threshold input 219 of the missing pulse monostable time delay 203. A capacitor 222 has a positive terminal which is connected to the collector of the discharge transistor 204 and also is connected to the threshold input 219 of the missing pulse monostable time delay 203. The negative terminal of the capacitor 222 is connected to ground. The input transistor 206 has a base which forms the second input 22 of the daylight detector 20. The emitter of the input transistor 206 is connected to ground. The collector of the input transistor 206 is connected to the first input 21 of the daylight detector. The output switching transistor 205 has a base which is connected to the output 216 of the missing pulse monostable time delay 203. The emitter of the output switching transistor 205 is connected to ground, while the collector of the output switching transistor 205 forms the output 23 of the daylight detector 20. The daylight detector 20 operates as follows. When daylight falls below a threshold level, as determined by the variable resistor 215, the phototransistor 201 causes the output of the amplifier 202 to emit logical zeros. This triggers the timing cycle of missing pulse monostable time delay 203. The value of the capacitor 222 effects the length of this timing cycle. In the preferred embodiment, the capacitor has a value of 220 uF which provides for a timing cycle of approximately 2½ minutes. The missing pulse monostable time delay unit 203 can only operate while receiving the proper combination of signals through the inputs 21-22 of the daylight detector 20. The missing pulse monostable time delay only operates when receiving logical ones from the first input 21 of the unit, and while receiving logical zeros through the second input 22 of the unit. Thus, the daylight detector only operates when the unit is in use. Without this wiring, the headlight actuator could be used to turn on headlights either when the windshield wipers are in use, or when daylight falls below a threshold level irrespective of windshield wipers. This configuration is expressly considered to be a part of the disclosed invention. Until the phototransistor 201 receives 2½ minutes of uninterrupted daylight, the output 216 of the missing pulse monostable time delay 203 causes output switching transistor 205 to send a signal to the first time delay circuit 40 which causes the first time delay circuit 40 to continue running a timing cycle, which keeps the AND gate equivalent circuit 60a receiving the appropriate signals from the outputs 42, 52 of the time delay circuits 40, 50 and keeps the headlights on.

The power supply 5 which runs the unit comes from the power which runs the windshield wiper unit. This power, as previously specified, is filtered of motor hash through the coil 801, capacitors 803, 804, and diode 802, as well as the opto-isolation unit 301.

It must be appreciated that various minor modifications may be made to the circuitry of the disclosed device without departing from the scope or spirit of the invention disclosed.

We claim:

1. A device for actuating headlights of an automobile, comprising:
    a first time delay circuit, having a connector for attachment with a windshield wiper switch of the automobile, and an output, the first time delay circuit being set to run a first timing cycle for a first pre-set time upon receiving pulses from a windshield wiper motor of the automobile;
    a second time delay circuit, having an input electrically coupled with the output of the first time delay circuit, and an output, the second time delay circuit being set to run a timing cycle for a second pre-set time upon receiving a signal from the output of the first time delay circuit;
    a logical AND gate having a first input connected to the output of the first time delay circuit, a second input connected to the output of the second time delay circuit, and an output, the AND gate being set to allow a current to pass when the second time delay circuit has completed the second timing cycle and the first time delay circuit is running the first timing cycle; and
    a relay circuit having an input connected to the output of the AND gate, and an output, the relay being connected to a switch for operating the headlights of the automobile.

2. A device for actuating headlights of an automobile according to claim 1, further comprising:
    a daylight detector circuit having a first input connected to the output of the first time delay circuit, a second input connected to the output of the second time delay circuit, and an output connected to the input of the first time delay circuit, the daylight detector being set to maintain the headlights in an on condition after the first time delay circuit stops receiving pulses from the windshield wiper motor unless the daylight detector receives uninterrupted daylight for a pre-set period of time.

3. A device for actuating headlights of an automobile according to claim 1, further comprising:
    a filter circuit having an input connected to the output of the relay, a second connector for attachment with an accessory wire of the automobile, and a third connector for attachment with a ground of the automobiles.

4. A device for actuating headlights of an automobile according to claim 2, further comprising:
    a filter circuit having an input connected to the output of the relay, a second connector for attachment with an accessory wire of the automobile, and a third connector for attachment with a ground of the automobiles.

5. A device for actuating headlights of an automobile, comprising:
    an opto-isolator having a power input connected to a power source, a connector input, a first output connected to a ground, and a second output;
    means for connecting said connector input of said opto-isolator to a windshield wiper switch;
    a first time delay having a power input connected to said power source, a reset input connected to said power source, a trigger input connected to said power source and to said second output of said opto-isolator, a threshold input connected to said power source and to said second output of said opto-isolator, a control output connected to a first capacitor to said ground, a discharge input connected to said power source and to said second output of said opto-isolator, a ground input connected to said ground, and an output;
    a first power transistor having a collector connected to said power source, an emitter connected to said ground, and a base terminal connected to said second output of said opto-isolator;
    a second capacitor connected in parallel with said first power transistor between said emitter and said collector of said power transistor;
    a second time delay having a power input connected to said power source, a reset input connected to said power source, a trigger input connected to said power source, a threshold input connected to said power source and through a fourth capacitor to said ground, a control output connected to through a third capacitor to said ground, discharge input connected to said power source and through said fourth capacitor to said ground, a ground output connected to said ground, and an output;
    a fifth capacitor connected to said output of said first time delay;
    a first transistor having a base connected to said fifth capacitor, an emitter connected to said ground and a collector connected to said power source;
    a darlington transistor having a base connected, through a second diode, to said output of said first time delay, an emitter connected to said ground, and a collector;
    a second transistor having a base connected to said output of said second time delay, an emitter connected to said ground, and a collector connected to said power source;

a power relay having an input connected to said collector of said darlington transistor and an output;

a coil for filtering power to the actuator having an accessory connector a ground connector, a ground output connected to said ground, and a unit input connected to said output of said power relay, power for the actuator also being filtered through a sixth capacitor connected between said output of said power relay and said ground, a seventh capacitor connected between said power source and said ground, and a diode connected between negative terminals of said seventh and a sixth capacitors;

said power relay being connected in actuator in parallel with a blocking diode so that when current is supplied to said power relay by said collector of said darlington transistor, said power relay closes supplying power to the headlights; and means for detecting daylight, to ensure that the headlights remain on when the windshield wipers are turned off after dark, connected to said trigger input, said threshold input and said discharge input of said first time delay, to said base terminal of said first power transistor, to said fifth capacitor, to said base of said first transistor and to said base of said darlington transistor.

6. A device for actuating headlights, according to claim 5, wherein said means for detecting daylight comprises:

a phototransistor having an emitter connected to said ground and a collector connected to said power source;

an amplifier having an inverting input connected to said collector of said phototransistor, a non-inverting input and minus-voltage input connected to said power source, and an output;

a missing pulse monostable time delay having a trigger input connected to said output of said amplifier and also connected through a variable resistor to said power source, a reset input connected to said output of said first time delay and connected through a ninth capacitor to said ground, a power input connected to said power source, a discharge input connected to said power source, a threshold input connected to said power source, and an output;

a third transistor having a base connected to said output of said second time delay, an emitter connected to said ground, and a collector terminal connected to said reset input of said missing pulse monostable time delay;

a second power transistor having a base connected through said variable resistor to said power source, an emitter connected to said ground, and a collector connected to said power source; a tenth capacitor connected between said ground and a junction between said power source and said emitter of said second power transistor;

an output switching transistor having a base connected to said output of said missing pulse monostable time delay, an emitter connected to said ground, and a collector connected to said base of said first power transistor.

7. A device for actuating headlights of an automobile, comprising:

a time delay circuit having a connector for attachment with a motor of a windshield wiper of the automobile, and an output, the time delay circuit being set to run a timing cycle for a preset time out period upon receiving a pulse from the motor of the windshield wiper of the automobile; and a relay circuit permitting current to the headlights if before completion of the time out period of the time delay circuit one or more additional pulses are generated by the motor of the windshield wiper, the relay circuit having an input connected to the output of the time delay circuit, and an output being connected to a switch for operating the headlights of the automobile.

* * * * *